US009190796B2

(12) United States Patent
Barns et al.

(10) Patent No.: US 9,190,796 B2
(45) Date of Patent: Nov. 17, 2015

(54) APPARATUS FOR PRECISION INSERTION

(71) Applicant: DWFritz Automation Inc., Wilsonville, OR (US)

(72) Inventors: Christopher E. Barns, Portland, OR (US); Corbin Gene Voigt, Portland, OR (US); Michael Lawrence Corliss, Beaverton, OR (US); Alan James Swan, Aloha, OR (US)

(73) Assignee: DWFritz Automation Inc., Wilsonville, OR (US)

( * ) Notice: Subject to any disclaimer, the term of this patent is extended or adjusted under 35 U.S.C. 154(b) by 250 days.

(21) Appl. No.: 13/839,678

(22) Filed: Mar. 15, 2013

(65) Prior Publication Data

US 2014/0041215 A1 Feb. 13, 2014

Related U.S. Application Data

(60) Provisional application No. 61/681,361, filed on Aug. 9, 2012.

(51) Int. Cl.

| | |
|---|---|
| ***B23F 1/02*** | (2006.01) |
| ***H01R 43/26*** | (2006.01) |
| ***H01R 12/73*** | (2011.01) |

(52) U.S. Cl.

CPC ................ *H01R 43/26* (2013.01); *H01R 12/73* (2013.01); *Y10T 29/49147* (2015.01); *Y10T 29/53213* (2015.01)

(58) Field of Classification Search

CPC ............... H01B 13/00; H01B 13/0003; H01B 13/0006; H01B 13/008; H01R 43/26; H01R 12/73; Y10T 29/53213; Y10T 29/49147

See application file for complete search history.

(56) References Cited

U.S. PATENT DOCUMENTS

| | | | | |
|---|---|---|---|---|
| 4,009,738 | A * | 3/1977 | Baba et al. | 140/149 |
| 4,672,871 | A * | 6/1987 | Gudmestad | 83/151 |
| 4,879,926 | A * | 11/1989 | Wollermann et al. | 81/9.51 |
| 5,146,673 | A * | 9/1992 | Hoffa | 29/825 |
| 5,526,718 | A * | 6/1996 | Hoffa | 81/9.51 |
| 6,362,877 | B1 | 3/2002 | Kobayashi et al. | |
| 6,910,256 | B2 * | 6/2005 | Locher et al. | 29/564.4 |
| 7,251,876 | B2 * | 8/2007 | Rodriguez et al. | 29/564.6 |
| 7,257,878 | B2 * | 8/2007 | Locher et al. | 29/564.4 |
| 2002/0046463 | A1 | 4/2002 | Watanabe et al. | |
| 2003/0010065 | A1 | 1/2003 | Keogh | |
| 2007/0261228 | A1 * | 11/2007 | Locher et al. | 29/564.4 |

FOREIGN PATENT DOCUMENTS

| | | | |
|---|---|---|---|
| JP | 2007-324624 | A | 12/2007 |
| KR | 10-2011-0039082 | A | 4/2011 |

* cited by examiner

*Primary Examiner* — Carl Arbes

(74) *Attorney, Agent, or Firm* — Schwabe, Williamson & Wyatt

(57) ABSTRACT

Systems, apparatuses and methods are described herein for precision insertion. In various embodiments, a feeder device may be configured to feed an object such as wire from a wire source into a wire path. In various embodiments, a guidance device with a channel that at least partially defines the wire path may receive the wire fed from the feeder device. In various embodiments, a base may be provided for mounting at least one of a first substrate having a first aperture and a second substrate having a second aperture so that the first aperture of the first substrate is aligned with the second aperture of the second substrate. In various embodiments, the base may be configured to be movable relative to the guidance device to position the first substrate or second substrate so that the first or second aperture is aligned with the wire path.

21 Claims, 13 Drawing Sheets

FIG. 10B
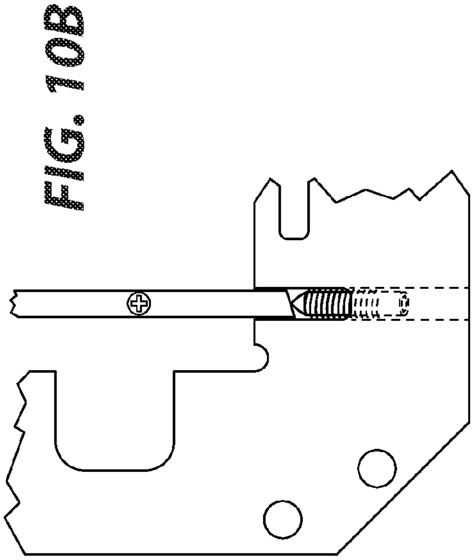
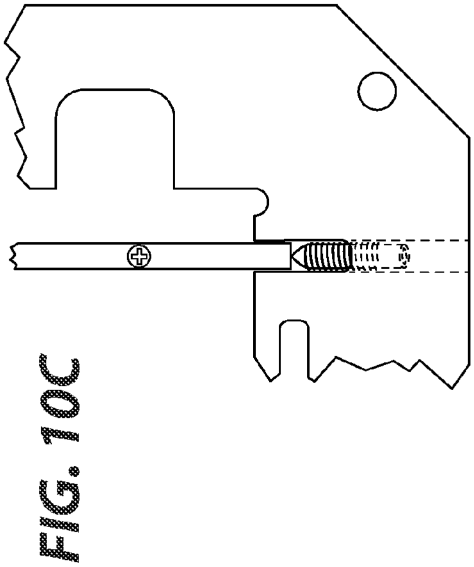
FIG. 10C
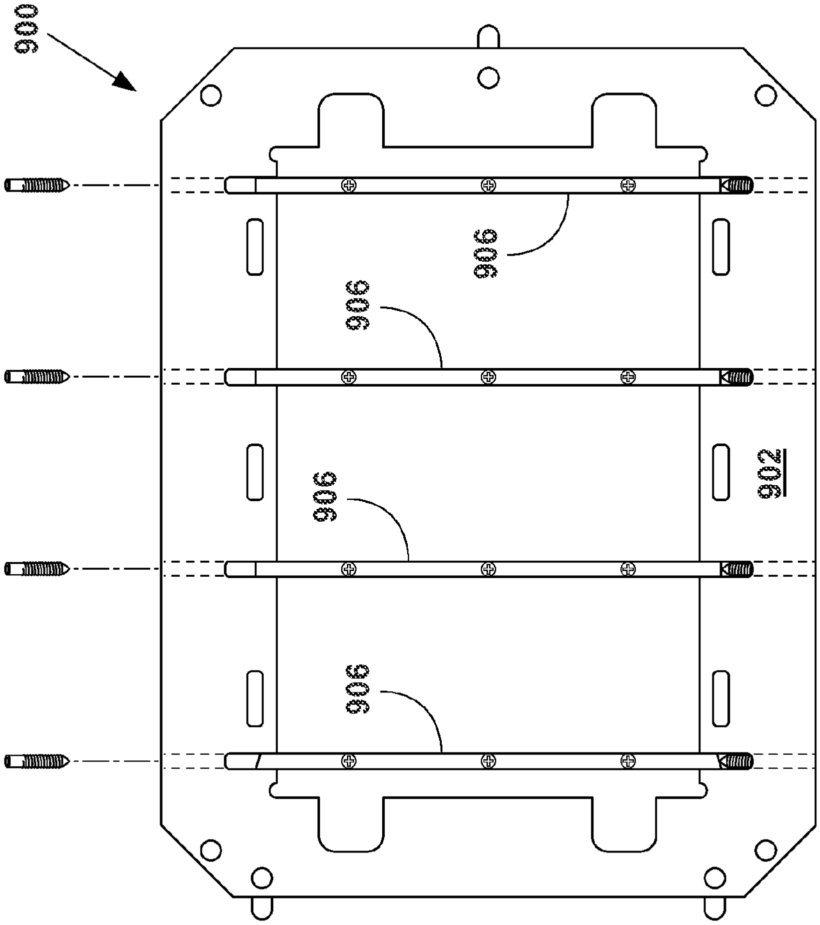
FIG. 10A

APPARATUS FOR PRECISION INSERTION

CROSS REFERENCE TO RELATED APPLICATIONS

The present application claims priority to U.S. Provisional Patent Application No. 61/681,361, filed Aug. 9, 2012, entitled "METHODS AND APPARATUS FOR PRECISION WIRE INSERTION," the entire disclosure of which is hereby incorporated by reference in its entirety.

TECHNICAL FIELD

Embodiments herein relate to the field of manufacturing, and, more specifically, to methods and apparatus for precision insertion.

BACKGROUND

A substrate such as a printed circuit board ("PCB") may be electrically and/or communicably coupled to another substrate via one or more interconnects. During manufacturing, substrates such as PCBs may sometimes be coupled to one another by hand. For example, a worker may guide, by hand, wires between various connection points and/or through apertures of multiple PCBs to interconnect the PCBs. This work may be tedious, repetitive, and prone to human error. Hand-coupled PCBs may tend to be assembled in a sloppy manner, which may lead to extra bulk, and potentially could cause the PCBs to malfunction. Moreover, even slight variability in wire insertion precision may affect circuit performance and consistency across PCBs.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 9-13 depict selected aspects of assembly and use of a pallet to mount substrates, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "NB" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
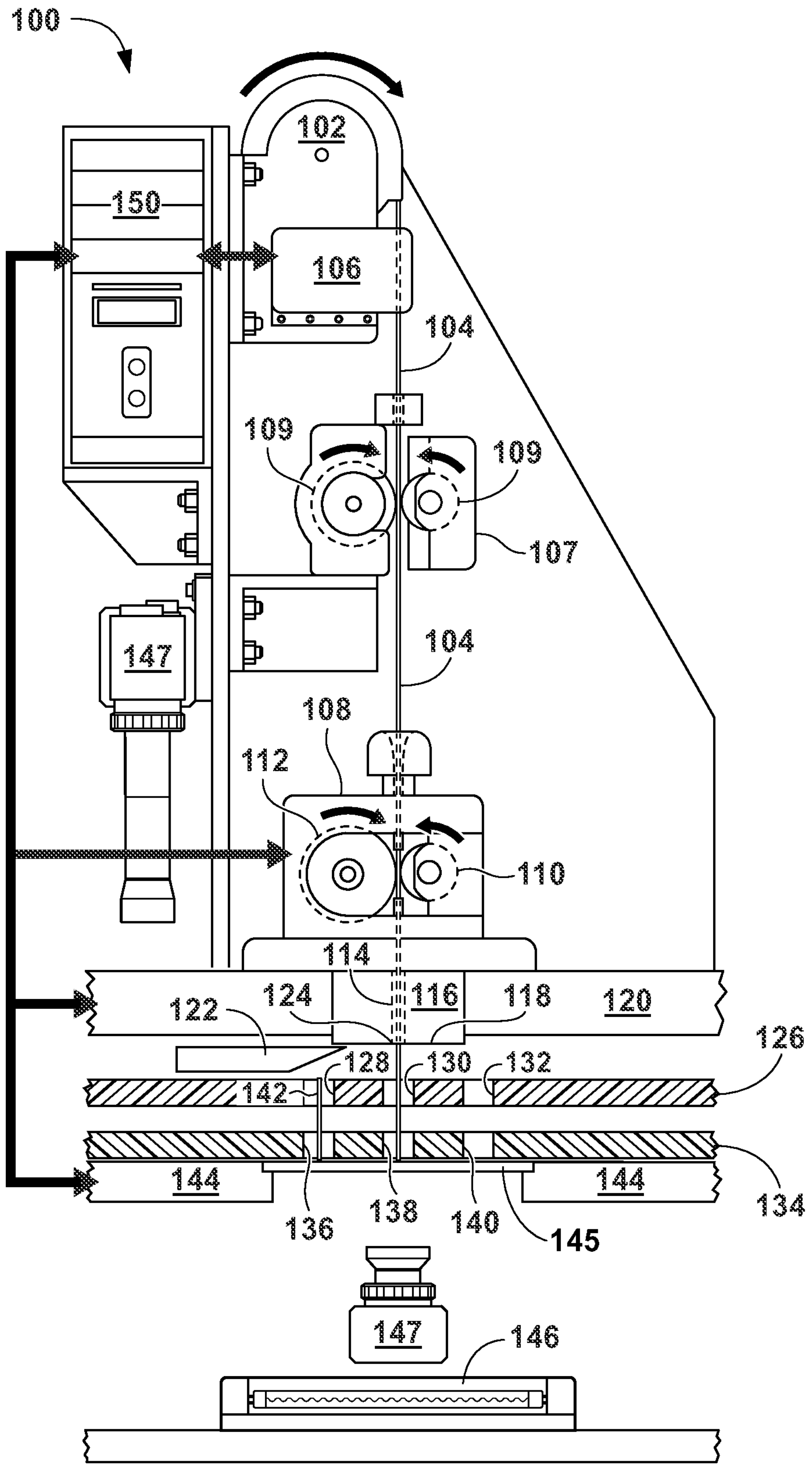
FIG. 1 schematically illustrates an example precision insertion system, in accordance with various embodiments.

Referring now to FIG. 1, a precision wire insertion system 100 is depicted, in accordance with various embodiments. The components of FIG. 1 are drawn schematically, not to scale, and so the relative sizes of and distances between components in FIG. 1 should not be construed as limiting in any way. Additionally, actual components represented by the schematic components of FIG. 1 may look much different than shown in FIG. 1.

In various embodiments, including many of the examples described herein, precision wire insertion system 100 may be used to insert wire into aligned apertures of multiple substrates so that wire interconnects may be created between the multiple substrates. While many of the examples described herein refer to printed circuit boards ("PCB") as the substrates, this is not meant to be limiting. Disclosed precision wire insertion systems and methods may be used to precisely insert wire through apertures in any number of components, such as flexible circuit substrates (e.g., polyimide, polyether ether ketone, transparent conductive polyester film), ceramic, metal or plastic substrates, and so forth. Moreover, while wire insertions are described in numerous examples herein, this is not meant to be limiting, and disclosed techniques may be employed in other precision insertion applications.

In various embodiments, wire may be straightened and/or otherwise processed prior to use. For instance, in some embodiments, wire may be de-reeled from an original spool and feed through one or more linear wire feeding devices, e.g. by TAK Enterprises of Bristol, Conn. Such a feed device may have a controlled velocity mismatch of approximately 3%. This may result the wire being yielded with a 3% strain. This process may erase any prior memory (e.g., non-straightness) of the spooled wire, and may result in substantially straight wire with a radius of curvature (Rc) greater than, e.g., 150 or 200 mm, 1000 wire diameters, or in some cases, greater than two meters.

For example, suppose a 140-feet length of copper is used. The wire may first be "relaxed," or pre-stretched by an additional 5%. One way to accomplish this includes marking off an unobstructed path of not less than 150 feet, and marking at 0 and 140 feet. Place an additional mart approximately 7 feet (e.g., 140×1.05=147) from the 140 foot mark. Anchor one end of the wire at the o mark, and then unroll approximately 142 feet of wire just past the 140 foot mark. Gently roll and tape the end of the wire over a tube (e.g., made of cardboard or other material) to reduce stress during the stretch process. Using hand pressure, apply a steady force until the end of the wire opposite the 0 mark reaches the 147 foot mark.

Once straightened, wire may then be loaded (e.g., wrapped) onto a storage reel or hoop that limits inducement of curvature. In various embodiments, 20" to 40" inch diameter hoops, and in some cases 30" diameter hoops, may be used where 145 micron diameter wire is used. In various embodiments, a tension of the wire may be controlled during re-spooling. In various embodiments, the wire may be laid in a parallel placement (e.g., level wind) process to assure that the wire is not locally bent.

In various embodiments, wire may be worked onto the reel or spool from the inside to the outside. One end of the wire may be fed through a hole in the side of the reel. Where the wire exists the hole, the end may be secured, e.g., with a small piece of tape. The wire may then be wound onto the reel. It may be preferable to avoid using overriding turns and to maintain slight tension (without adding further stretch to the wire). In some embodiments, the wire reel may be friction-fit over a plurality (e.g., three) spring-loaded spokes that extend from a hub assembly.

In FIG. 1, a wire supply 102, in the form of a spool or reel in FIG. 1, may provide a supply of wire of 104. Wire 104 may have been pre-stretched as described above, e.g., to reduce wire memory. Wire supply 102 may be configured to provide wire 104, e.g., upon rotation of the spool in the direction shown by the arrow. In some embodiments, the spool may be rotated by a rim drive mechanism (not shown), which may be a mechanism that exerts force at or near the rim of the spool to effect rotation of the spool in the direction of the arrow. In other embodiments, the spool forming wire supply 102 may be rotated by a hub-based rotational mechanism (not shown). In various embodiments where wire supply 102 is a spool of wire, a rim drive mechanism may be simpler and/or less expensive than a hub drive mechanism. In various embodiments, wire supply 102 may be servo-driven (e.g., driven based at least in part on feedback).

Various types of wire 104 may be used. In some embodiments, wire 104 may be an ultra-straight wire with a radius of curvature ("RC") that is greater than 200 mmRC. In some embodiments, wire 104 may have a diameter that is greater than 0.2 mm. In various embodiments, wire 104 may have various cross-sectional shapes, including but not limited to circular, ovular, square, rectangular, triangular, and any other polygon. In various embodiments, wire 104 may be made of various conductive and/or non-conductive materials or combinations thereof, including but not limited to metals (e.g., copper), plastics, and so forth.

In various embodiments, a slack-measuring device 106 (e.g., an electrical dancer) may be employed to measure slack of wire 104, e.g., between wire supply 102 and downstream components. By sensing that wire 104 is slack electrically, it may be possible to stop wire payout without inducing any curvature. For example, slack-measuring device 106 may include a conductive tube (e.g., gold plated) through which wire 104 is fed. If wire 104 touches a conductive inner surface of the tube, a circuit may be closed, indicating too much curvature in wire 104.

In various embodiments, wire slack measurements may be used by various components of wire insertion system 100 to reduce and/or prevent wire 104 from physically contacting edges and/or surfaces of other downstream components. Slack measurement may additionally or alternatively be used to control output of wire supply 102 via a rim drive mechanism (not shown) to feed wire 104 to downstream components. In various embodiments, output of wire supply 102 may be controlled, e.g., based at least in part on measurements from slack-measuring device 106, to ensure that wire 104 is as straight as possible as it begins its journey from wire supply 102 to downstream components. In various embodiments, a path followed by wire 104 throughout operation of wire insertion system 100 may be referred to as a "wire path." The wire path between wire supply 102 and downstream components may be kept clear of any possible impediments to ensure straightness of wire 104.

In various embodiments, a passive encoder 107 may be provided for performing various functions. Passive encoder 107 may include two or more rollers 109 between which wire 104 may be fed. In various embodiments, passive encoder 107 may be a Capstan configured to receive and/or guide wire 104 along a path, but feed it along the path with no more than minimal force. In various embodiments, passive encoder 107 may have a positive grip on wire 104 and a low inertia, e.g., to ensure accurate tracking of wire 104 insertion length.

In various embodiments, a feeder device 108, which in some embodiments may be a Capstan feeder, may be provided downstream of wire supply 102. In various embodiments, feeder device 108 may be servo-driven, e.g., based on feedback associated with various components described herein. In various embodiments, wire 104 may be routed between a first pinch roller 110 and a second pinch roller 112 of feeder device 108, which may be rotated as shown by the arrows. In various embodiments, feeder device 108 may apply pressure on wire 104, e.g., via first pinch roller 110 and/or second pinch roller 112. In various embodiments, the pressure applied by feeder device 108 may be controlled to ensure that it is not too high (which may cause unintended curvature in wire 104) and not too low (which may permit unintended slippage of wire 104).

In various embodiments, passive encoder 107 and feeder device 108 may be used to determine an amount of slippage of wire 104, e.g., from the intended wire path. This slippage measurement may be used to determine whether wire 104 has contacted other components unintentionally. Unintentional contact with other components may cause wire 104 to buckle, which in turn may cause other problems, such as jamming of feeder device 108. Because passive encoder 107 may not feed wire 104 itself, wire 104 may not slip relative to passive encoder 107. However, wire 104 may slip relative to feeder device 108. Accordingly, in various embodiments, a spatial or positional difference of wire 104 between passive encoder 107 and feeder device 108 may be indicative of or proportional to a wire slippage amount.

For instance, wire 104 may slip relative to feeder device 108 while it continues to increment a respective count. Meanwhile, passive encoder 107 may not increment a respective count because wire 104 did not move with respect to it. The difference between the count associated with passive encoder 107 and the count associated with feeder device 108 may indicate slippage.

In various embodiments, the wire path may be strictly controlled, downstream of feeder device 108, and/or elsewhere. Free lengths of wire—e.g., lengths of wire that are not laterally constrained—such as a length of wire between feeder device 108 and immediately adjacent components, may be minimized. In some embodiments, free lengths of wire of less than 5 mm may be enforced. In some embodiments, an internal diameter ("ID") that is less than 0.5 mm may also be enforced, to reduce wire buckling and jams. In some embodiments, feeder device 108 and guidance nozzle 116 may limit an unguided length of wire 104 to less than twenty wire diameters downstream of feeder device 108.

In various embodiments, the various rollers described herein may be coated with a relatively soft material, such as 70D durethane, and may have similar diameters, hardness and thickness to each other, e.g., to minimize induced wire curvature. In various embodiments, first pinch roller 110 and/or second pinch roller 112 may have similar adjusted to center wire 104 as it enters a channel 114 of a guidance nozzle 116 downstream of feeder device 108. In various embodiments, guidance nozzle 116 and its channel 114 may at least partially define the wire path. In some embodiments, first and second rollers 110 and 112 may be in contact with each other under controlled pressure/force. In various embodiments, tangency between first pinch roller 110 and/or second pinch roller 112 may be adjusted in a direction of the wire path (straight down in FIG. 1) and in a perpendicular direction. This may ensure wire 104 is centered as it enters channel 114, so that wire 104 does not physically contact a surface of guidance nozzle 116.

In various embodiments, guidance nozzle 116 may be configured to guide wire 104 so that it has a clearance from an inner surface of channel 114 of approximately 2-12 microns. In various embodiments, guidance nozzle 116 may also be configured to guide wire 104 along the wire path for various lengths (downward direction in FIG. 1). For example, in some embodiments, channel 114 may have a length of approximately 5-15 mm, e.g., 10 mm.

In various embodiments, guidance nozzle 116 may include multiple guidance sub-nozzles (not shown) defining multiple channels with various diameters. For instance, an initial (e.g., most upstream) sub-nozzle may have a diameter of about 300 microns, although it could be as wide as ~1 mm. A middle sub-nozzle may also have a diameter of about 300 microns. A final sub-nozzle may have a tighter clearance (2-12 microns) and a guidance length of greater than 2 mm, such as 10 mm. In various embodiments, entries and/or exits from these sub-nozzles may be chamfered and/or beveled. In various embodiments, portions of the sub-nozzles surrounding their exits may be conical (or more generally, have a "male" shape), so that they may fit into an entry of another sub-nozzle (e.g., with a "female" shape).

Guidance nozzle 116 and/or channel 114 may be constructed with various materials and components, including but not limited to hypodermic tubing, a tungsten carbide nozzle, a sapphire orifice, and/or a ceramic ferule. In various embodiments, a ceramic ferule may be a zirconia ferule, e.g., part number MM-FER2002-1470 from Precision Fiber Projects, Inc. of Milpitas, Calif.

To maximize perpendicularity of wire 104 relative to a wear surface plane 118, as wire 104 exits channel 114, feeder device 108 and/or other components may be adjusted to center a tip of wire 104 within an entrance into an aperture of a downstream substrate (examples discussed below). In various embodiments, a tip of wire 104 may be positioned by feeder device 108 and/or other components so that it is not more than about 15 microns away from a center of the entrance to an aperture of a downstream substrate. In some embodiments, the tip of wire 104 may be positioned by feeder device 108 and/or other components so that it does not substantially contact the entry of the downstream substrate aperture.

In various embodiments, the exit from channel 114 and/or an end of guidance nozzle 116 may be flush with wear surface plane 118. In various embodiments, wear surface plane 118 may be defined by an end of guidance nozzle 116 and or other components, such as a wear surface-defining component 120. In various embodiments, a shearing blade 122 may define a plane that is parallel to wear surface plane 118. In various embodiments, shearing blade 122 may be movable along wear surface plane 118 (left/right in FIG. 1) to cut wire 104 once wire 104 is inserted through openings in two or more PCBs, as will be discussed below. In various embodiments, wear surface plane 118 may guide blade 122 across the exit of channel 114 in a controlled manner.

In various embodiments, wear surface plane 118 may include but is not limited to hard brass, stainless steel, sapphire and/or other long-lasting materials. In various embodiments, blade 122 may be held in place flush against wear surface plane 118 so that nothing protrudes beyond a surface of blade 122 facing away from wear surface plane 118. In some embodiments, one or more magnets (not shown) may be used to secure blade 122 against wear surface plane 118. In some embodiments, wear surface-defining component 120 and/or guidance nozzle 116 may include magnetic materials configured to magnetically secure blade 122 to a blade actuating mechanism.

In various embodiments, blade 122 may have a thickness that is selected to permit the bottom opening of channel 114 to be as close as possible to a substrate such as a first PCB 126. For example, in some embodiments, blade 122 is less than about 0.015" thick, and in some embodiments is 0.012" thick. In various embodiments, blade 122 may be a microtome blade. In various embodiments, blade 122 may be constructed of various materials, such as stainless steel. In various embodiments, blade 122 may be single side ground, e.g., be flat on the wear surface plane 118 side and have sharpening features created on the opposite side. For example, a surface of blade 122 opposite the surface that faces wear surface plane 118 may have little to no relief, to permit an exit of channel 114 to be as close to PCBs as possible. As will be discussed below, once wire is inserted through apertures in two or more PCBs, blade 122 may be moved to shear off a portion of wire 104 within the PCB apertures. Movement of blade 122 may be caused by any suitable mechanism, such as a mechanical actuator, an orbital actuator, a slide, etc.

It may be desirable to ensure that a sheared tip of wire 104 is as perpendicular as possible relative to a longitudinal axis of wire 104. Failure to create a perpendicular cut tip may lead to problems locating or inserting the next wire tip (as will be discussed below). Accordingly, in various embodiments, blade 122 may be single-sided with the flat side facing wear surface plane 118. In various embodiments, a bottom interior radial corner 124 of channel 114 may be square, as opposed to beveled or chamfered, to further ensure a perpendicular cut of wire 104. In various embodiments, blade 122 may have a single side grind of approximately 3" long by 0.5" deep. In some embodiments, blade 122 may have a 60 degree bevel for 0.002" and a 15 degree relief for the remaining blade thickness, which in some embodiments may be less than 0.5 mm, e.g., 0.3-0.4 mm.

As describe above, wire 104 may be fed through apertures of substrates such as PCBs for various purposes. In some embodiments, after insertion, wire 104 may be cut to form an interconnect between two or more PCBs. In FIG. 1, for instance, a first PCB 126 may include any number of apertures, such as a first aperture 128, second aperture 130 and third aperture 132. A second PCB 134 to which first PCB 126 is being interconnected may have the same or a different number of apertures. In FIG. 1, for instance, second PCB 134 includes a fourth aperture 136, a fifth aperture 138 and a sixth aperture 140. Although in many of the examples described, wire is inserted through PCB apertures to form interconnects, this is not meant to be limiting, and wire may be precision inserted through PCBs or other substrates for other reasons.

A basic process in accordance with various embodiments may operate as follows. Wire 104 may be fed from wire supply 102 through channel 114 of guidance nozzle 116 into an aperture of first PCB 126 and an aligned aperture of second PCB 134. An example of this is seen in FIG. 1 where wire 104 is in the process of being inserted through second aperture 130 of first PCB 126 and fifth aperture 138 of second PCB 134. In this example, a wire interconnect 142 has already been created through first aperture 128 of first PCB 126 and fourth aperture 136 of second PCB 134. Wire 104 may be fed through second aperture 130 of first PCB 126 and fifth aperture 138 of second PCB 134 until a tip of wire is securely within the aperture of the lower PCB and its presence in this aperture verified. At that point, blade 122 may be actuated (e.g., moved from the left to right in FIG. 1) to cut wire 104 just above first PCB 126. In various embodiments, wire 104 may be cut and used as a PCB interconnect if it successfully passes through first PCB 126 without physically contacting an edge of an aperture (e.g., 130). Such contact could potentially deflect wire 104 so that it might miss an aperture (e.g., 138) of second PCB 134.

In various embodiments, when cutting wire 104, blade 122 may be moved from its nominal or "parked" position (e.g., to the left of channel 114 in FIG. 1) to a cutting position, e.g., by passing left-to-right over the bottom exit of channel 114 in FIG. 1, and then back to its nominal position, using various mechanisms (not shown). In various embodiments, an orbital actuation system may be used to move blade 122 back and forth. In some embodiments, the orbital actuation system may have a 4 mm orbital diameter. All or only a portion of the orbital stroke may be utilized to move blade 122. In various embodiments, the nominal position of blade 122 may be within approximately 0.25 mm of wire 104. In various embodiments, during each cut, blade 122 may travel a total distance of approximately 0.5 mm. In various embodiments, a cutting stroke of blade 122 may be relatively quick, e.g., less than approximately 10 milliseconds. In various embodiments, blade 122 may be periodically shifted laterally along a length of its sharp end to maintain its sharpness, maintain clean wire cuts, and/or extend the life of blade 122.

Figure 3:
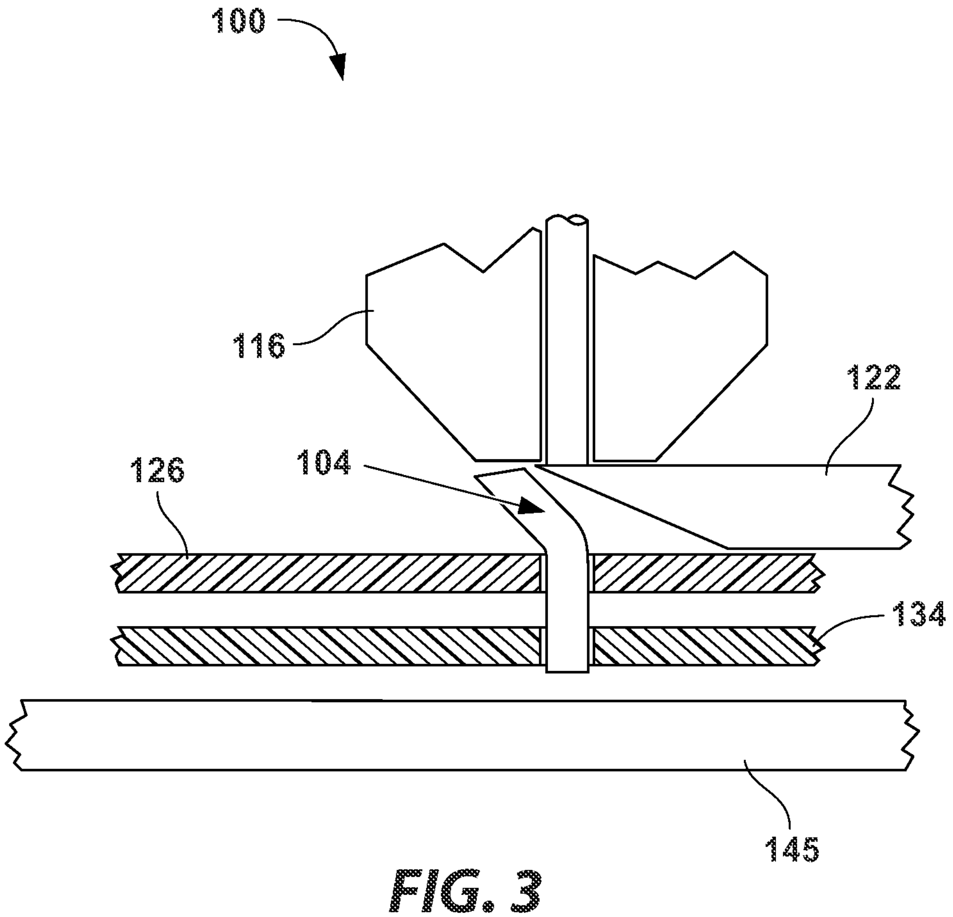
FIG. 3 depicts an example of what might happen if a blade is used to cut a wire without any motion compensation by other components, in accordance with various embodiments.

In various embodiments, if wire 104 were held absolutely stationary while being cut by blade 122, there may be a chance the wire would be bent above first PCB 126 in an undesirable manner. An example of this is seen in FIG. 3. The lateral motion of blade 122 has caused wire 104 to be bent above first PCB 126.

Figure 4A:
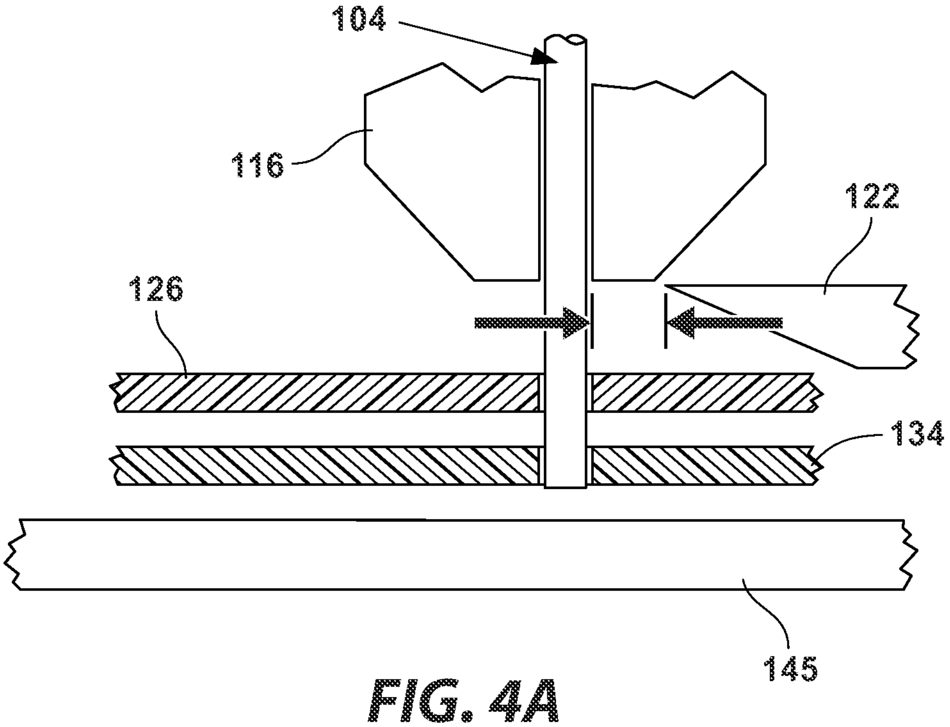
FIGS. 4A-B depict an example of how components other than a blade may be moved along with the blade during wire cutting, in accordance with various embodiments.
Figure 4B:
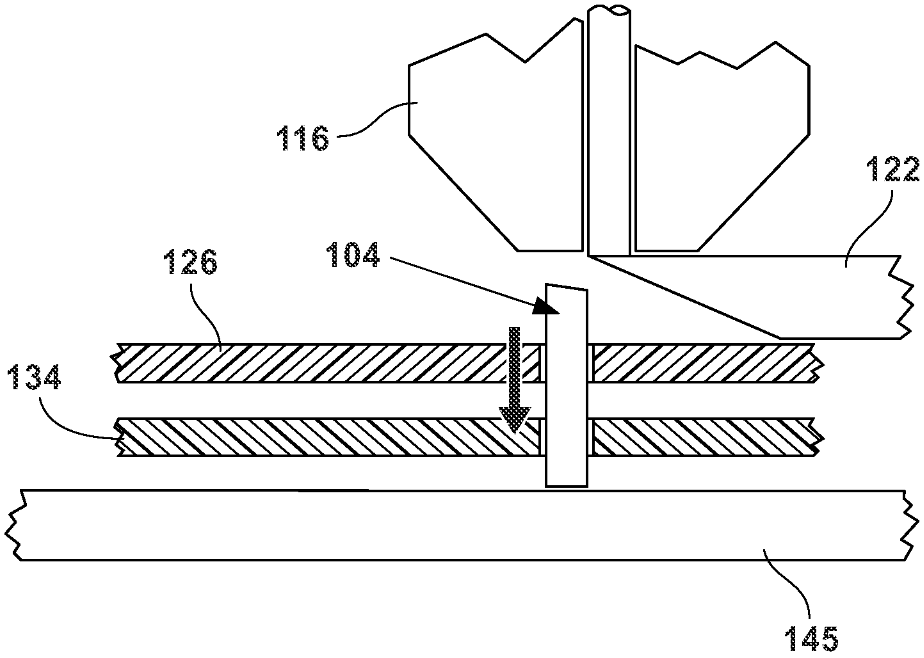

To avoid this or at least reduce the probability of it happening, in various embodiments, one or more components of base 144 may move in coordination with a cutting stroke of blade 122. An example of this is seen in FIGS. 4A-B in which first PCB 126 and second PCB 134 are both moved to the left with blade 122. When blade 122 returns from its cutting position to its nominal position, it may not bend the cut portion of wire 104, which in turn may allow the cut portion of wire 104 to freely fall further into the PCB apertures in which it is inserted. In some embodiments, the cut portion of wire 104 may stop when it contacts a transparent surface 145 below second PCB 134, so that the top of the newly cut wire portion is substantially flush with a top surface of first PCB 126.

In various embodiments, portions of wire insertion system 100 may be moveable relative to one another in order to facilitate insertion of wire 104 through various PCB apertures. For example, in various embodiments, one or more components of base 144 and/or other components may be movable (e.g., using gears, controls and electronics not shown) relative to guidance nozzle 116. By moving one or more components of base 144 and/or other components, first PCB 126 and second PCB 134 may be repositioned relative to one another and/or channel 114. In some embodiments, one or more of feeder device 108, guidance nozzle 116, one or more pallets for receiving PCBs, and blade 122 may be movable, together or independently, relative to base 144 and/or PCB boards (e.g., 126, 134) in order to align channel 114 with PCB apertures in which interconnecting wire is desired.

In some embodiments, second PCB 134 may be moveable relative to first PCB 126, or vice versa, to align PCB apertures. For instance, in some embodiments, first PCB 126 and/or second PCB 134 may be securely placed onto or into a pallet (not shown in FIG. 1 but an example is described below) or other component that may itself be removably mounted on base 144.

Various techniques may be used to determine a depth of wire 104 within PCB apertures. In some embodiments, transparent surface 145 (e.g., made of glass or sapphire) may be mounted on base 144 below second PCB 134, such as approximately 0.4 mm below a bottom surface of second PCB 134. In various embodiments, transparent surface 145 may additionally or alternatively be mounted (removably or permanently) on a pallet into which one or more PCB boards is removably mounted. Blade 122 may be actuated to cut wire 104 when it is confirmed that wire 104 has been inserted through all or a portion of an aperture (e.g., fifth aperture 138) of second PCB 134. If it cannot be confirmed that wire 104 has been so inserted, then in various embodiments, wire 104 may be withdrawn (e.g., by feeder device 108) and a length of wire 104 may be discarded before retrying the insertion.

In various embodiments, machine vision may be employed at one or more locations to calibrate and otherwise operate wire insertion system 100. In various embodiments, one or more image capture devices 147 (e.g., cameras) and/or one or more mirror assemblies (not shown) to redirect light in various directions may provide machine vision at various vantage points. In the embodiment of FIG. 1, image capture devices 147 may be positioned at various vantage points to provide machine vision of a tip of wire 104 being inserted through PCB apertures. For example, a first image capture device 147 may be provided below second PCB 134, and another may be provided above first PCB 126, e.g., at or near guidance nozzle 116 or off to the side as shown in FIG. 1 (in which case mirrors may be employed to direct light thereto). One or both image capture devices 147 may be configured to provide machine vision of one or more entries (top or bottom) into an aperture (e.g., 130) of first PCB 126 and/or second PCB 134.

In various embodiments, machine or human vision may be used to align PCB apertures. In various embodiments, a vision calibration process may calculate a two-dimensional transformation. This transformation may map coordinates from captured image data (e.g., pixel locations) to physical coordinates. In various embodiments, wire insertion system 100 may compensate for vision errors such as camera aspect ratio and/or lens distortion.

In various embodiments where image capture devices 147 include cameras, camera calibration may be performed at various points. For example, camera calibration may be performed where a camera has been disturbed or bumped. Camera calibration may also be performed where a camera F-stop or focus has been modified. In various embodiments camera calibration may be performed where a distance between guidance nozzle 116 and first PCB 126 is altered (e.g., by raising or lowering a pallet on which PCBs are mounted).

In some embodiments, after camera calibration or otherwise, a hole mapping procedure in which wire is inserted through known holes in a sample PCB may be implemented to correct for small errors in camera calibration (e.g., induced by stage rotation) and top-to-bottom camera offset calibration (e.g., vision errors/non-perpendicularity of gutter fiducial). An automated hole verification process may verify and refine data creating during the hole mapping procedure. Ideally, a resulting scatter plot will show a grouping of dots more or less centered on 0,0 (or whatever Cartesian coordinate is used for center), and most of the dots will be within 0.001" of the origin. In various embodiments, acceptable system performance (e.g., acceptable wire insertion) may be achieved where a standard deviation of less than or equal to 0.0003" in both an X and Y direction is achieved. If dots are more than one thousandth of an inch away from the original and/or the standard deviation is greater than 0.0003", recalibration or other fine tuning may be warranted.

Figure 2:
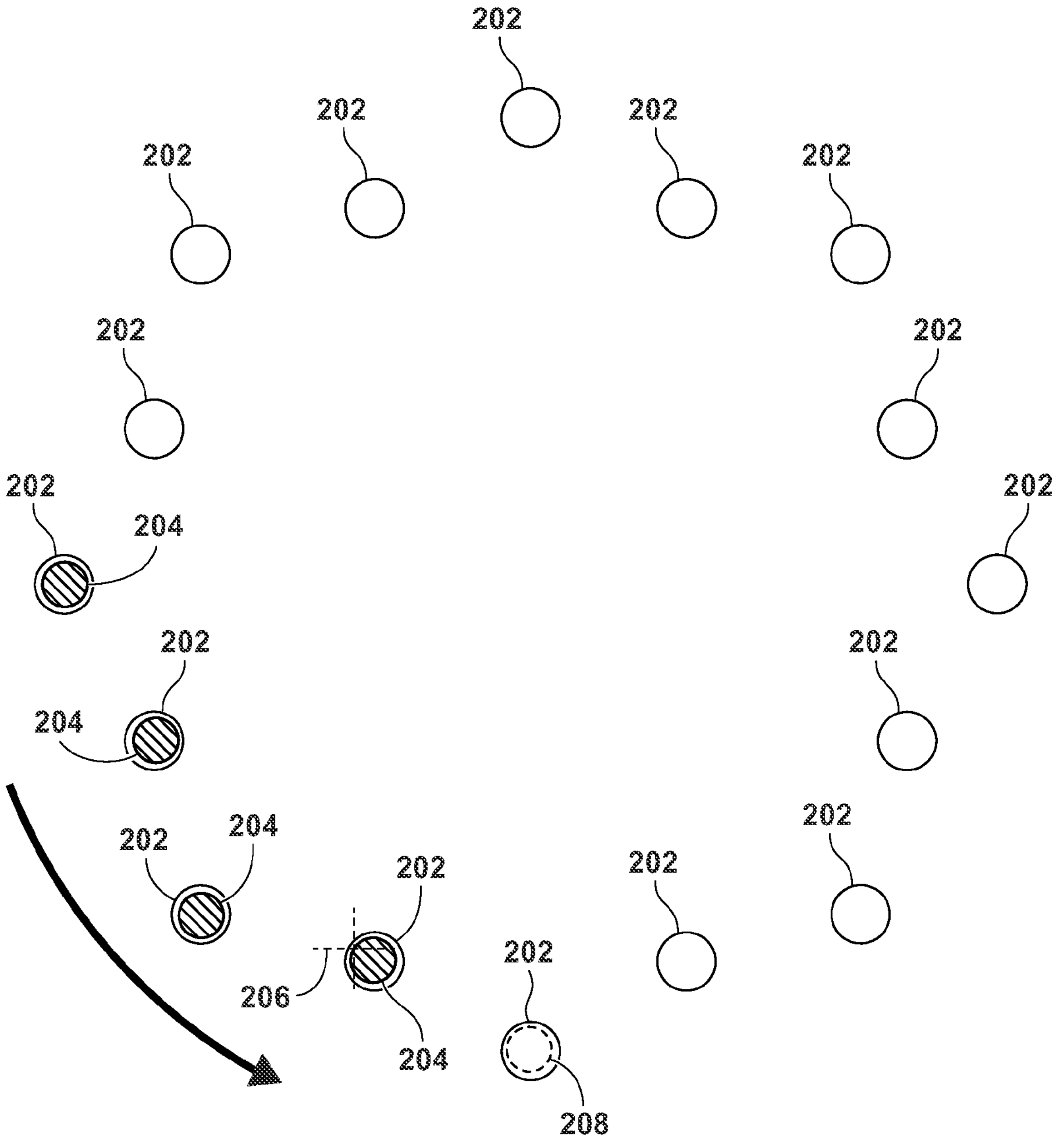
FIG. 2 schematically illustrates an example of predictive precision placement of wire, in accordance with various embodiments.

One example of how vision technology may be used with computer software is shown in FIG. 2, which represents a machine-vision view from the bottom up of a bottom PCB, such as might be provided by image capture device 147 in FIG. 1. A plurality of apertures 202 through the PCB are shown in a particular configuration, but this is not meant to be limiting, and any number of apertures in any arrangement may be utilized. Starting at the left-most aperture 202, wire 204 has been inserted into four apertures 202 in the direction shown by the arrow.

In the fourth aperture 202, a visual indicator 206 is shown demarking a top left portion of wire 204. In various embodiments, this measurement may be used, either alone or in combination with wire measurements from previous apertures, to predict where wire 204 will fall within the next aperture 202. This is seen in the next aperture 202 in the sequence, in which a predictive indicator 208 (which may be referred to as a "live wire offset") is seen. As suggested by the visual indicator 206, wire 204 is tending to veer slightly off center within aperture 202, upward and to the left. Thus, predictive indicator 208 in the next aperture 202 is also shown upward and to the left. In various embodiments, if the live wire offset becomes too great, a correction may be made, e.g., by moving a base (e.g., 144 in FIG. 1) on which a bottom PCB (e.g., second PCB 134 in FIG. 1) is mounted. In this manner, wire 204 may be placed in the next aperture 202 as close to a center as possible, rather than where predictive indicator 208 is shown.

In various embodiments, multiple samples, e.g., scatter plots, may be used to predict where the next wire placement within an aperture 202 will be. Multiple samples may be used to ensure that a position of a tip of wire 204 is placed as stably and consistently within apertures 202 as possible. In various embodiments, when measured wire 204 positions within one or more apertures 202 are less than a predetermined standard distribution from a centroid of previous wire tip position samples (e.g., approximately 5-15 microns, such as approximately 13 microns), a centroid of the last N samples may be used to predict where wire 204 will fall in the next aperture 202. In various embodiments, the centroid may be required to be within approximately 15 microns of a center of an aperture 202 before moving on to the next aperture 202. In various embodiments, vision error may be mapped, e.g., by capturing an image of the top of first PCB 126, and then running first PCB 126 over a lower camera to characterize a telecentricity error of a lens of the bottom camera.

Referring back to FIG. 1, in various embodiments, base 144 may include one or more light sources 146 configured to provide light through one or more light-permeable surfaces (e.g., 145) of base 144. In some embodiments, backside diffuse illumination may be used. In various embodiments, a top PCB aperture (e.g., aperture 130) may be illuminated using front side ring light illumination.

In various embodiments, multiple PCB apertures, e.g., apertures in first PCB 126, may be located at one time. For example, backside diffuse illumination may be used in tandem with multiple shifts of base 144 to cause light passing through apertures of second PCB 134 to fully illuminate holes on a bottom surface of first PCB 126.

In various embodiments, wire insertion system 100 may be calibrated prior to and/or during operation. In various embodiments, first PCB 126 (or in some cases second PCB 134) may be placed on base 144 alone. A segment of wire 104 may be inserted into an aperture of first PCB 126. First PCB 126 may be shifted (e.g., by shifting base 144) a small distance in multiple directions while a tip of wire 104 is observed, e.g., by an operator or by machine vision. If the tip wiggles, that suggests wire 104 has contacted an edge of the aperture of first PCB 126. In various embodiments, this calibration technique may be used to determine a center position of the aperture, e.g., a position within the aperture with equal clearance in all directions.

In various embodiments, found positions of apertures in first PCB 126 and/or second PCB 134 may be used to align the PCBs, and to predict locations where wire 104 will pass when inserted. In various embodiments, passive encoder 107 may track wire fed through wire insertion system 100. In various embodiments, passive encoder 107 may be used to determine whether wire 104 has been inserted to a proper depth. For instance, if wire 104 contacts a top surface of either first PCB 126 or second PCB 134, the force of that contact may cause measurable slippage between passive encoder 107 and feeder device 108. By comparing passive encoder counts of a drive to measurements from feeder device 108, it is possible to quantify slippage of wire 104 and perform appropriate corrections. In various embodiments, wire 104 may slip enough that it may not have reached an aperture in second PCB 134, but yet may be visible through a camera or machine vision component (e.g., 147) within base 144. In such case, wire 104 may be withdrawn and discarded before trying again for a successful and confirmed insertion. However, if wire 104 is not visible through the aperture of second PCB 134, then wire 104 may be retracted and a portion discarded.

As more wire interconnects are inserted through aligned apertures of first PCB 126 and second PCB 134, and as operation progresses to other apertures, existing interconnects may tend to limit an ability to adjust first PCB 126 and second PCB 134 relative to each other. Accordingly, in various embodiments, rotational alignment of first PCB 126 and second PCB 134 may also be considered. Rotational alignment may be calibrated prior to operation and adjusted during operation (e.g., on the fly). In various embodiments, rotational alignment of the substrates may be represented by an active theta axis. In various embodiments, substrate apertures may be rotationally aligned to approximately less than 0.0005" over 3.0", or approximately 0.2 mrad, rotational error across a length of a substrate, e.g., to ensure wire 104 is able to be inserted through aligned apertures in first PCB 126 and second PCB 134.

Additionally or alternatively, in various embodiments, various other components may be adjusted in other directions to ensure alignment of PCB apertures and unimpeded insertion of wire 104 therethrough. In some embodiments, components such as guidance nozzle 116 may be tiltable to alter the wire path, which in various embodiments may reduce necessary accuracy of alignment between apertures of second PCB 134 with apertures of first PCB 126. In some such embodiments, first PCB 126 and second PCB 134 may be more rigidly secured to one another, which may maintain their flatness and planarity. This in turn may reduce a likelihood that cut portions of wire 104 may stick up too high from a top surface of first PCB 126. It may also reduce a risk that portions of wire 104 may fall in between first PCB 126 and second PCB 134.

In various embodiments, once all desired PCB apertures have inserted wire interconnects, wire insertion system 100 may be configured to secure the interconnects within the PCB apertures. For example, in various embodiments, wire insertion system 100 may solder or otherwise secure wire interconnects to first PCB 126 and/or second PCB 134 in order to ensure the wire interconnects do not fall out of the bottom of second PCB 134 once PCBs 126, 134 are removed from the base.

In various embodiments, in the event of failure of one or more wire insertions into PCB apertures, one or more auto-recovery routines may be implemented by wire insertion system 100. In some embodiments, multiple portions of wire 104 may be discarded as part of an insertion retry sequence to ensure that prior damaged wire is gone and that current wire 104 is less likely to be misshapen. In some embodiments, a scatter plot may be created, e.g., with image capture device 147, to determine that a portion of wire 104 currently being inserted through apertures of PCBs is of sufficient quality (e.g., straight enough). In some embodiments, an auto-recovery sequence may include initially retrying insertion of wire 104 at the same locations. If wire 104 itself was the reason for failure, rather than misalignment of PCB apertures, then this retry technique may be successful.

In various embodiments, an auto-recovery sequence may include repositioning wire 104 and/or one or more PCBs by a sequence of predetermined distances in predetermined directions (e.g., north, south, east, west). In some embodiments, a separate insertion attempt may be made at each location. In some embodiments, the predetermined distance from the original insertion location may be approximately 15 microns.

In various embodiments, an image of first PCB 126 may be acquired and used to find aperture locations for an auto-recovery sequence. In various embodiments, second PCB 134 may be released, e.g., from securing components (not shown) on base 144, realigned and resecured, so that insertion may be tried again. In various embodiments, wire insertion system 100 may include controls that allow an operator to manually adjust base 144 or other components, to attempt to manually insert wire 104 through PCB apertures in the event of insertion failure.

In various embodiments, wire insertion system 100 may include a number of other components that are not shown herein. In some embodiments, base 144 may be part of a movable cart or vehicle on which wire insertion system 100 is mounted.

In various embodiments, operations described herein may be controlled by a computer system. For instance, in FIG. 1, an onboard computer system 150 may be operably coupled to various components that may provide data to and/or receive instructions from onboard computer system 150. In FIG. 1, onboard computer system 150 is operably coupled to slack-measuring device 106, feeder device 108 and base 144, but this is not meant to be limiting. Onboard computer system 150 may be connected to, provide instruction to and receive data (e.g., feedback) from any number of components of PCB interconnect computing device. Feedback from various components may be utilized to make various adjustments, e.g., to ensure that PCB apertures are properly aligned. In various embodiments, onboard computing device 150 may also execute instructions that cause the display of interfaces like the one shown in FIG. 2 to be displayed to a user.

In various embodiments, onboard computer system 150 may include a touch screen interface for interacting with various components. Additionally or alternatively, a computer system that controls wire insertion system 100 may be separate from and/or remote from wire insertion system 100, and may communicate with and/or assert control over wire insertion system 100 via one or more local or wide area computer networks, such as the Internet.

Other components that may be part of wire insertion system 100 include but are not limited to parallel wire insertion methodologies. For example, a mechanism may be provided that facilitates insertion of more than one wire at one time. Gimbaled orifice wire insertion methodologies may be implemented. This may facilitate parallel insertion of wire and provide the ability to rigidly connect the two PCB's together. This may also provide for the possibility of elimination of the trim stage.

Figure 5:
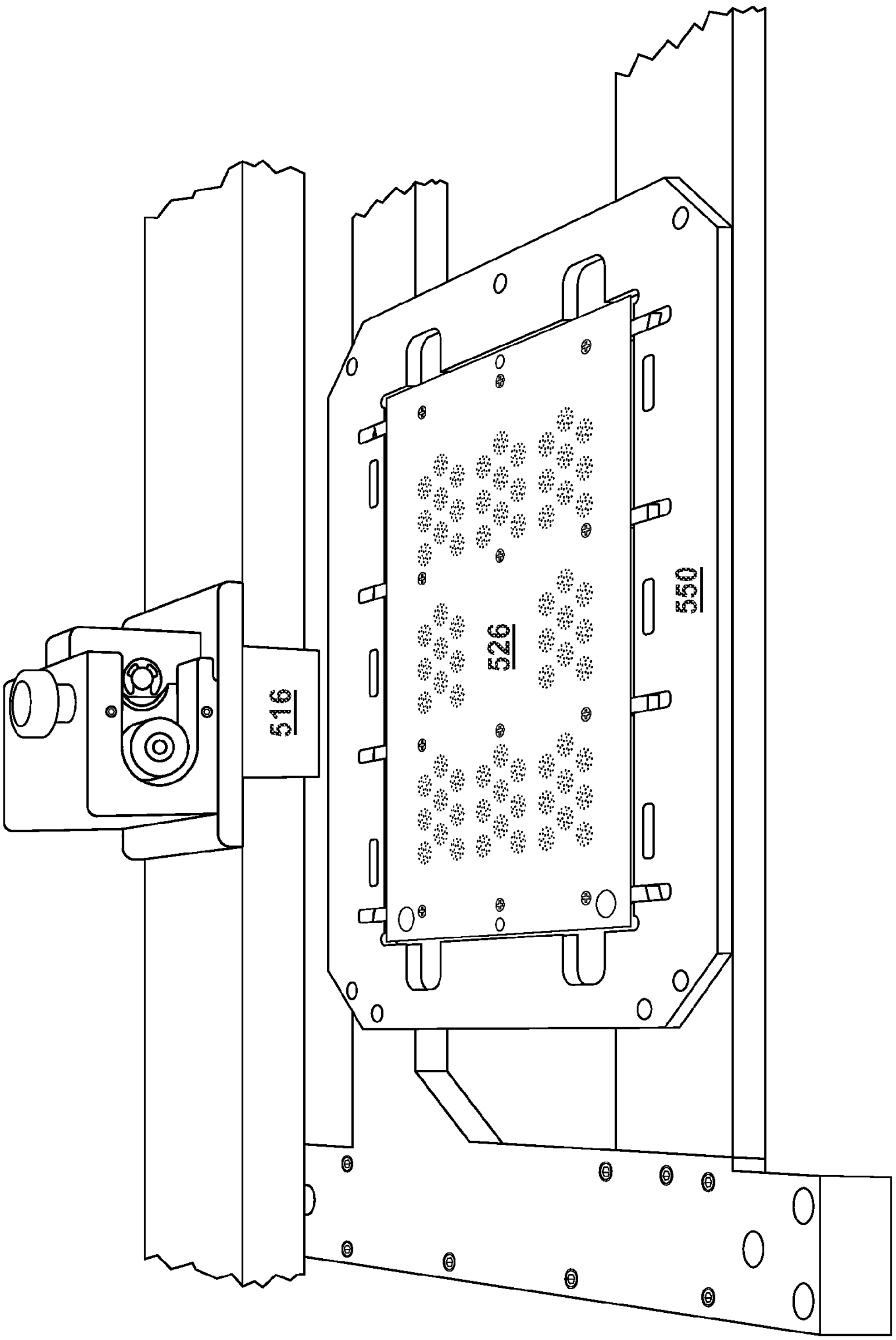
FIGS. 5-8 depict selected aspects of an example precision wire insertion system, in accordance with various embodiments.
Figure 6:
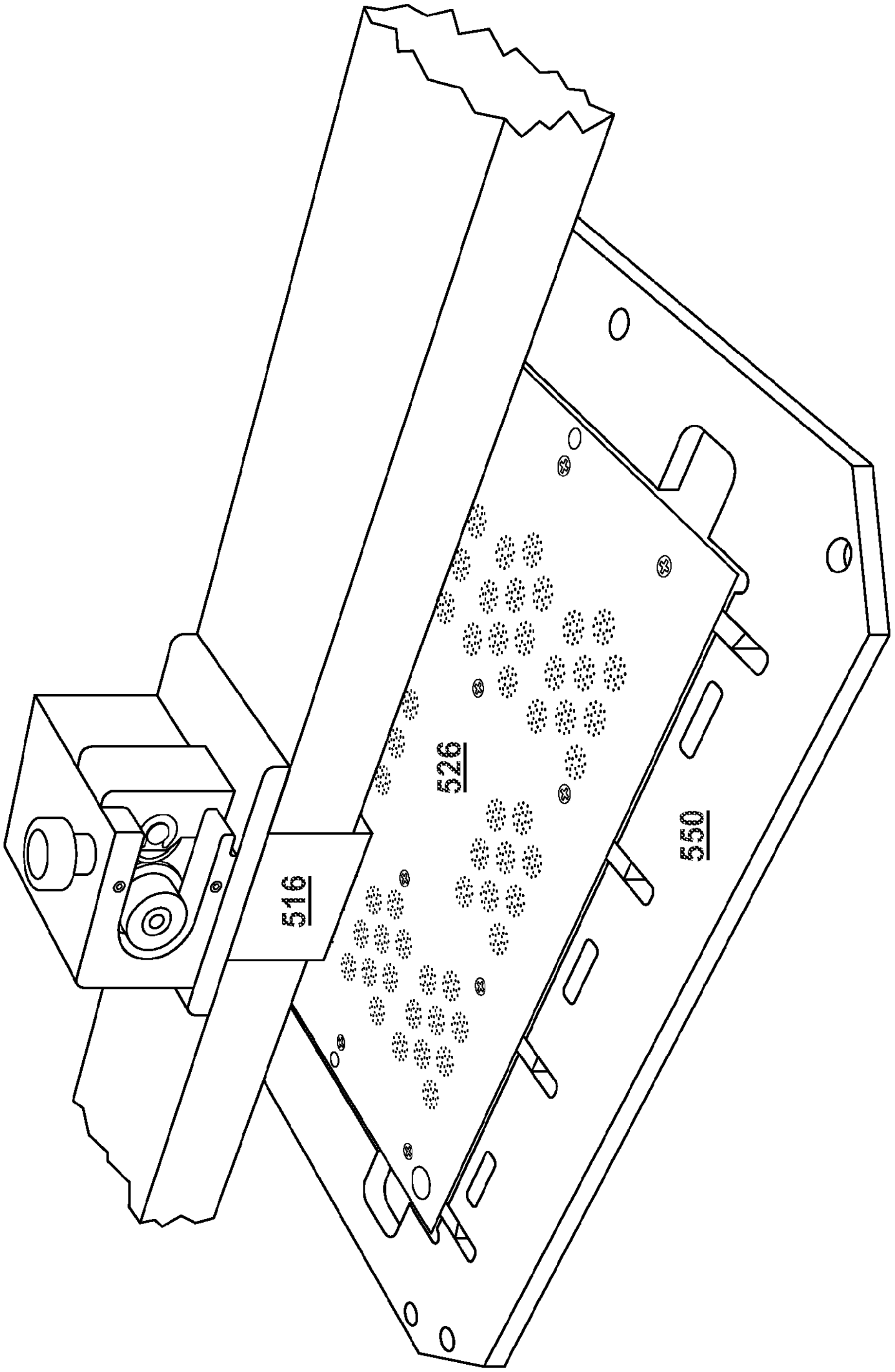

FIGS. 5-8 depict selected aspects of one example of a PCB interconnect system similar to wire insertion system 100, in accordance with various embodiments. In FIG. 5, a PCB 526 mounted on a pallet 550 is being placed by hand onto a base. A bottom PCB may be present but not visible. FIG. 6 shows a portion of the PCB interconnect system in operation, wherein the base holding the PCB 526 moves the pallet 550 relative to a guidance nozzle 516.

Figure 7:
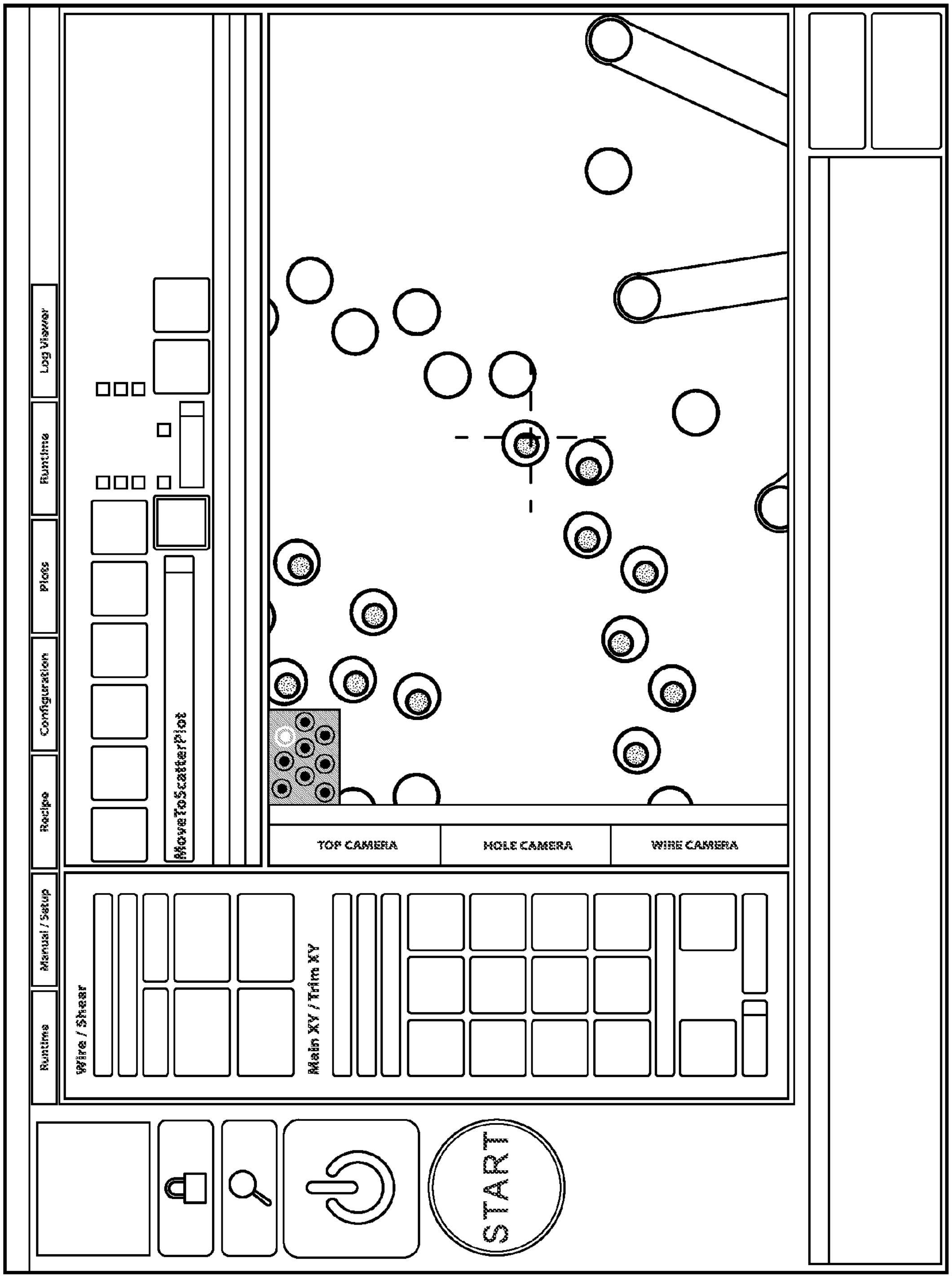
Figure 8:
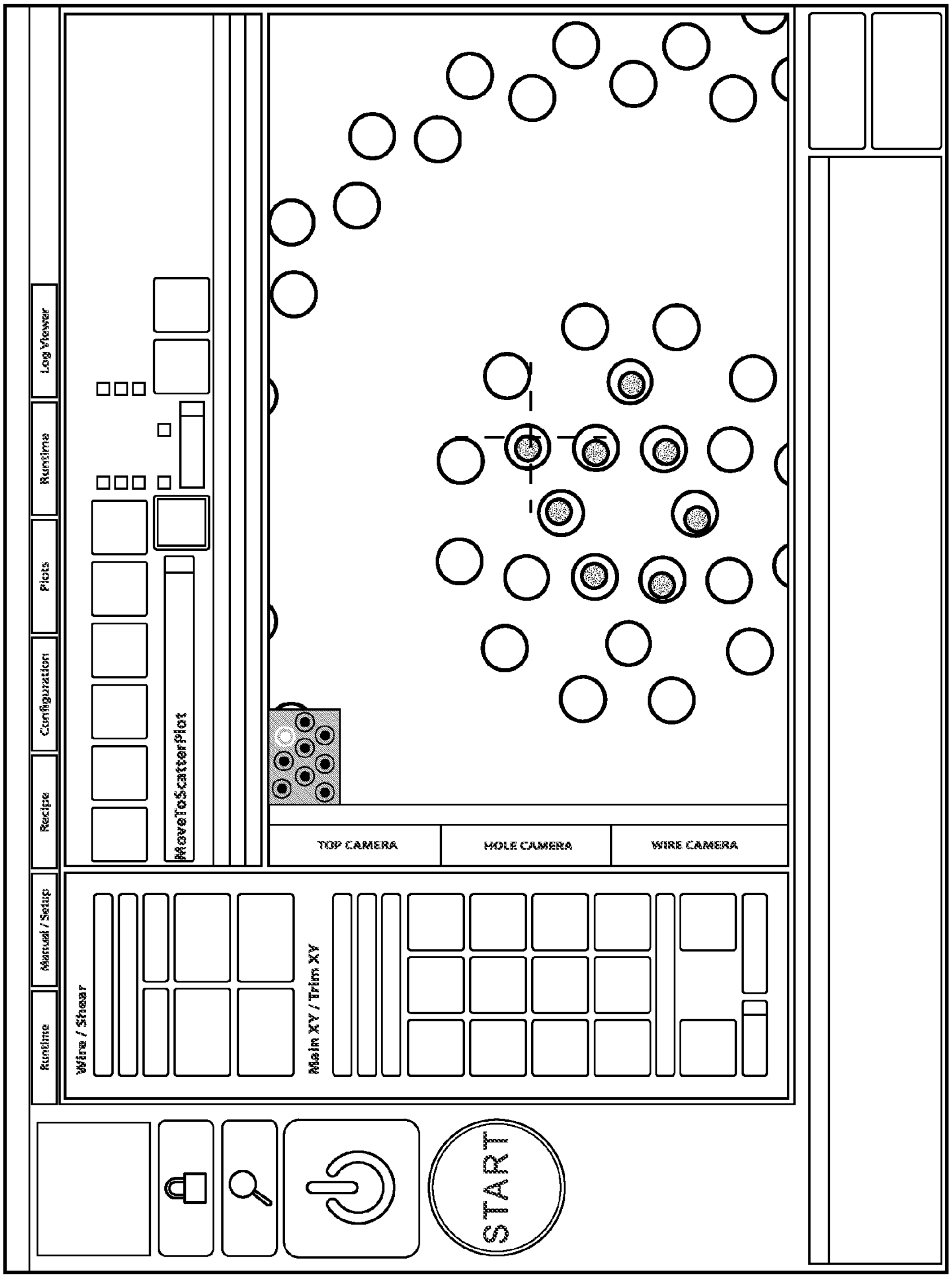
Figure 9:
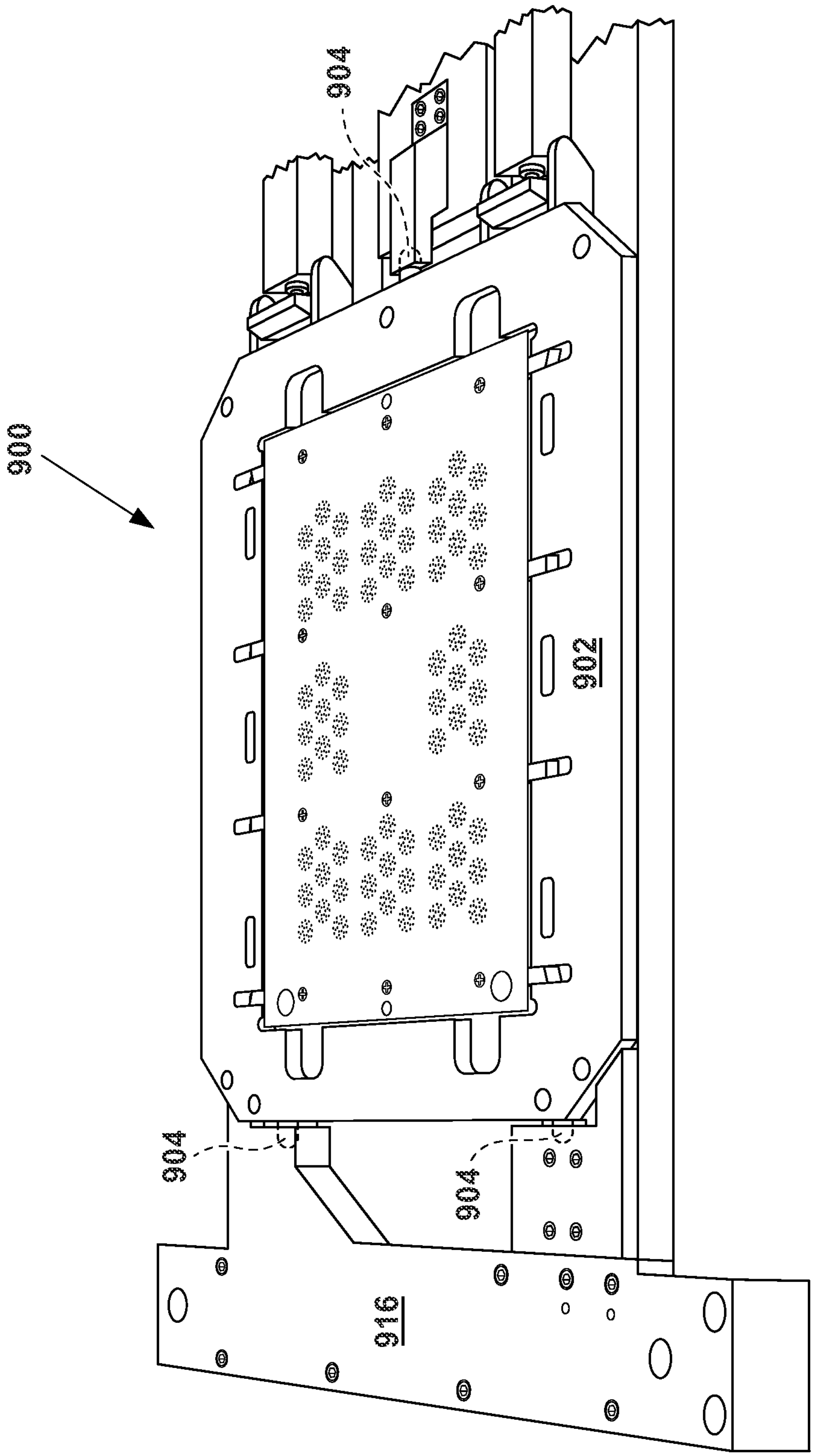

FIG. 7 depicts a screenshot from software associated with the PCB interconnect system of FIGS. 5-6. A visual indicator is visibly marking a bottom right position of a wire inside of a PCB aperture. FIG. 8 is a similar view, except shown in closer detail. Again, a visual indicator is visible at a bottom right position of a wire. However, a predictive indicator may be seen in an aperture to the left of the aperture with the visual indicator. The aperture with the predictive indicator may be next in line to receive wire. As noted above, if the predictive indicator is too far from a center of an aperture, corrections may be made.

As noted above, in various embodiments, one or more PCBs may be removably mounted on a pallet, and the pallet itself may be removably mounted to base 144. An example pallet 900 is shown in FIGS. 9-13. Pallet 900 may include an outer frame 902 with one or more components 904 configured for precision mounting of pallet 900 on a base. In various embodiments, components 904 may be alignment spheres. In various embodiments, these alignment spheres may be constructed with ruby. In some embodiments, components 904 may be 4 mm diameter ruby balls (e.g., part number RB4.0MMH) by Carbide Probes, Inc., of Dayton, Ohio.

As shown in FIGS. 10A-C, in various embodiments, pallet 900 may include a series of transverse bars 906. In various embodiments, PCBs (e.g., first PCB 126 and second PCB 134 in FIG. 1) may be installed in outer frame 902 so that they are secured to and separated from each other by transverse bars 906.

In various embodiments, a top PCB (e.g., first PCB 126 in FIG. 1) may be rigidly secured to pallet 900. In various embodiments, the bottom PCB (e.g., 134 in FIG. 1) may be held in place in pallet 900 with shoulder bolts that enable the bottom PCB to be moved relative to pallet 900 and/or the top PCB. When pallet 900 is first installed on a base (e.g., base 144 of FIG. 1), software executing on a controlling computer system (e.g., onboard computer system 150 in FIG. 1) may prompt an operator to manually align the top and bottom PCBs before the bottom PCB is entirely secured.

In various embodiments, one or more ends of transverse bars 906 may be beveled. As seen best in FIGS. 10B-C, in various embodiments, individual transverse bars 906 may be retained by a cone-tipped set screw at each end. In various embodiments, one of the transverse bars 906 may be beveled at both ends, so that the bar and any PCB fastened to it may be consistently oriented toward a particular side of pallet 900.

In various embodiments, assembly of one or more PCBs onto pallet 900 may include the following. Set screws around outer frame 902 may be loosened enough to permit each transverse bar 906 to move freely within pallet 900. In various embodiments, a top PCB may be mounted on transverse bars 906. For instance, the top PCB may be secured to transverse bars 906 using one or more screws or other fasteners, e.g., which may be screwed into corresponding holes in transverse bars 906.

Figure 11A:
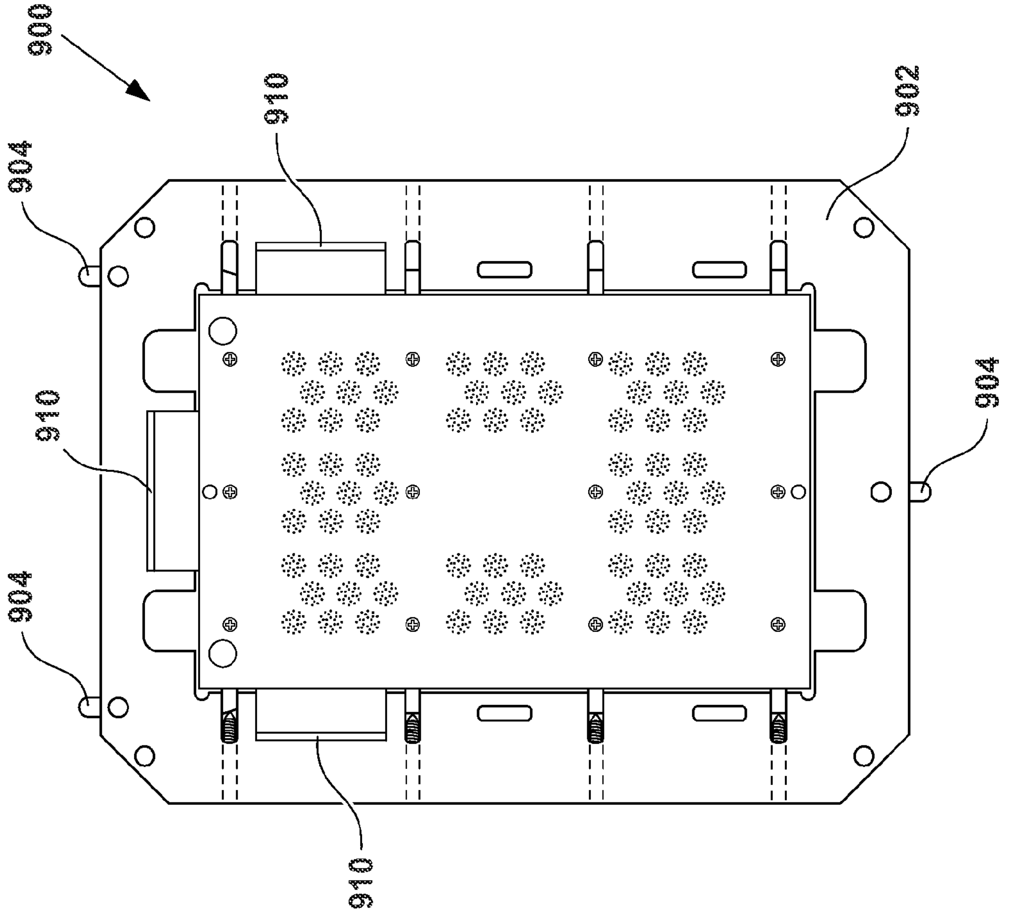
Figure 11B:
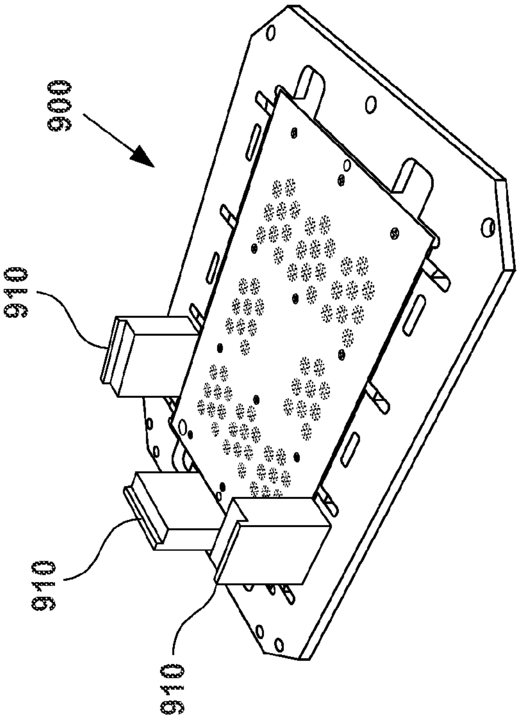

Various procedures may be used to align the top PCB on pallet 900 and to stabilize the top PCB and transverse bars 906 within outer frame 902. Referring now to FIGS. 11A-B, various numbers of gauge blocks 910, such as three, may be mounted on outer frame 902. Using hand pressure, the top PCB may be shifted by the operator against gauge blocks 910. Once the PCB is against gauge blocks 910, one or more set screws at an edge of pallet 900 may be tightened until one or more edges of the top PCB just begins to bear against gauge blocks 910. Gauge blocks 910 may then be removed.

Various procedures may be used to install a bottom PCB onto pallet 900, e.g., before or after a top PCB is installed onto pallet 900. In various embodiments, the bottom PCB may be loaded into outer frame 902 on a side of transverse bars 906 opposite the top PCB. In various embodiments, a series of fasteners, e.g., shoulder screws, may be inserted through the bottom PCB and into matching holes on a bottom of transverse bars 906. Once installed, the bottom PCB may move freely around the shoulder screws.

Figure 12A:
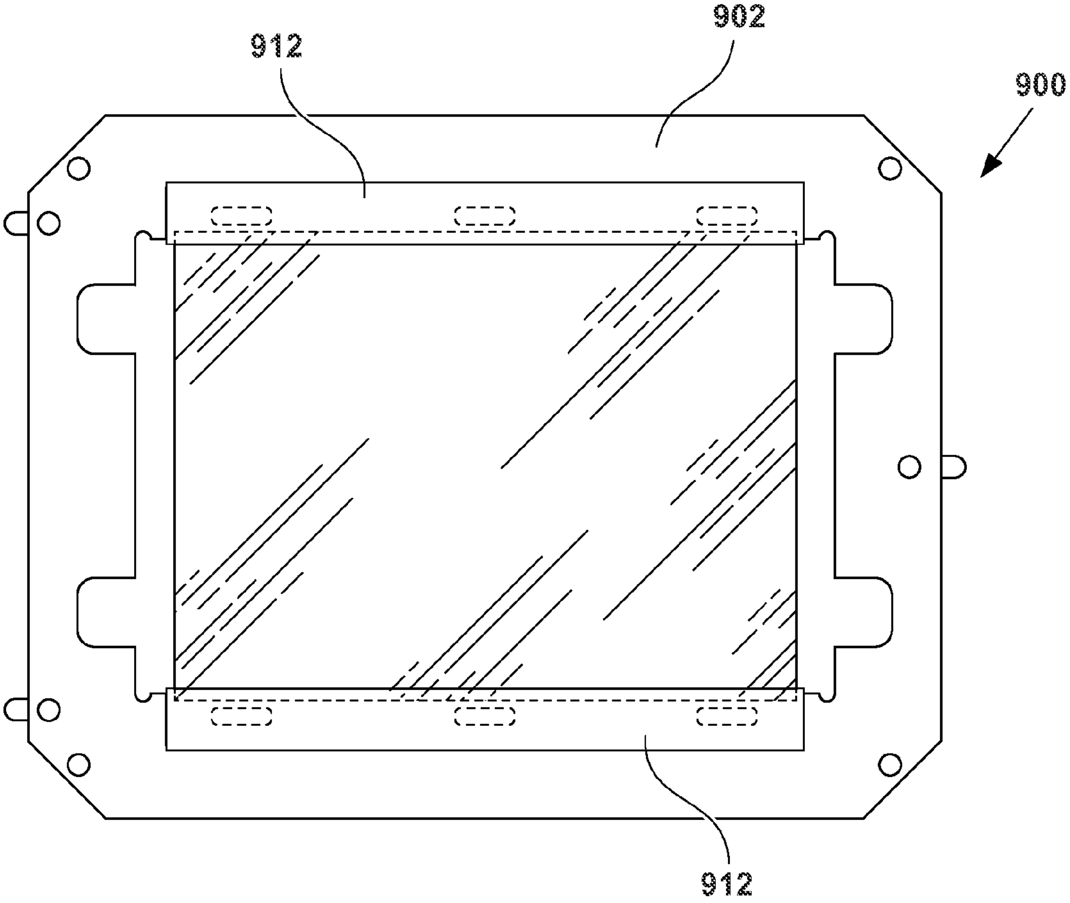
Figure 12B:
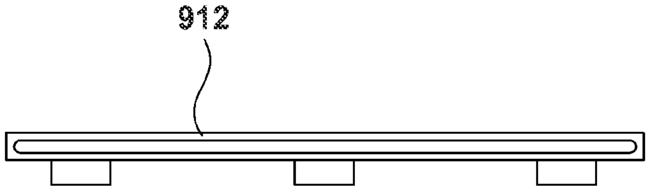

Referring now to FIGS. 12A-B, in various embodiments, pallet 900 may receive a glass panel, which in some embodiments may correspond to transparent surface 145 in FIG. 1. In various embodiments, the glass panel may prevent unsoldered wire interconnects from falling out of PCBs after insertion and cutting. In various embodiments, the glass panel may be offset by 0.015" from a bottom surface of a bottom PCB to provide space for the wire to move away from the shear and prevent the wire ends from getting bent. In various embodiments, the glass panel may be installed flat against an underside of pallet 900, e.g., on an opposite side of the bottom PCB from transverse bars 906. In various embodiments, the glass panel may be secured into one or more pockets of one or more window rails 912 associated with pallet 900. For instance, two or more window rails 912 may be installed, e.g., into outer frame 902, so that edges of the glass panel may be captured by matching pockets on the rails 912.

Once pallet 900 is assembled with PCB boards installed, it may be mounted on a base (e.g., 144) of a PCB interconnect system. Referring back to FIG. 9, in various embodiments, the components 904 of pallet 900 may be engaged with corresponding cupped faces of mounts on a base 916. In various embodiments, a portion of base 916 (e.g., on the right in FIG. 9) may be moved closer to pallet 900 in order to secure pallet 900.

Figure 13:
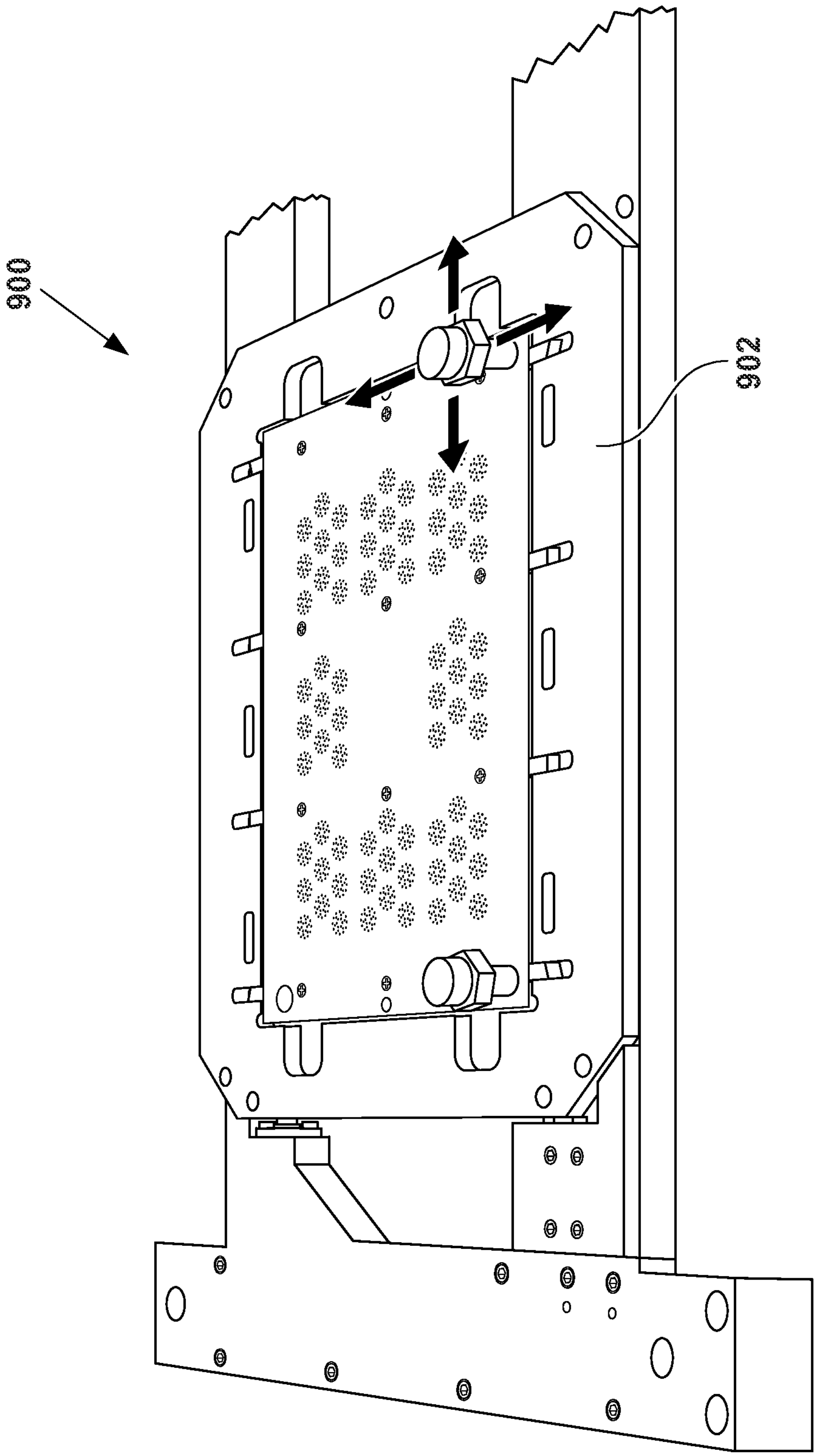

At this point, the top PCB may be securely mounted to pallet 900, and the bottom PCB may still be movable relative to the shoulder screws mentioned above. Various techniques (e.g., manual, machine vision-based) may be used to align the bottom PCB with the top PCB. In particular, apertures in one PCB may be aligned with apertures in another PCB, so that wire (e.g., 104) may be inserted therethrough. An example of how the bottom PCB may be moved to align PCB apertures is shown in FIG. 13. In various embodiments, while monitoring a machine vision feed of PCB apertures (e.g., from image capture device 147 in FIG. 1), the bottom PCB may be moved around (as shown by the directional arrows) until the on-screen machine vision image shows that the apertures of the top and bottom PCBs are concentric. The positions of the top and bottom PCBs, e.g., relative to each other and/or pallet 900, may be recorded by software, e.g., executing on onboard computer system 150 in FIG. 1.

EXAMPLES

Example 1 includes a wire insertion system comprising: a feeder device configured to feed wire from a wire source into a wire path; a guidance device with a channel that at least partially defines the wire path, to receive the wire fed from the feeder device; and a base for mounting at least one of a first substrate having a first aperture and a second substrate having a second aperture so that the first aperture of the first substrate is aligned with the second aperture of the second substrate, the base being configured to be movable relative to the guidance device to position the first substrate or second substrate so that the first or second aperture is aligned with the wire path.

Example 2 includes the wire insertion system of Example 1, further comprising a cutting device for cutting the wire after insertion through the first and second apertures.

Example 3 includes the wire insertion system of Example 2, wherein the cutting device is a single-sided blade with a flat side that is flush with a surface of the guidance device that is perpendicular to the wire path.

Example 4 includes the wire insertion system of Example 2, wherein the guidance device includes a magnetic wear surface that is parallel to a plane defined by the cutting device.

Example 5 includes the wire insertion system of Example 2, wherein the base is configured to be moved in tandem with movement of the cutting device to cut the wire.

Example 6 includes the wire insertion system of Example 1, wherein the feeder device comprises a Capstan.

Example 7 includes the wire insertion system of Example 6, wherein the wire source comprises a rim-driven hub.

Example 8 includes the wire insertion system of Example 1, further comprising a machine vision device configured to determine a distance of the wire from a center of the first aperture or second aperture.

Example 9 includes the wire insertion system of Example 8, further comprising logic configured to predict a distance of the wire from a center of a third aperture in the first substrate or a fourth aperture in the second substrate based on the determined distance.

Example 10 includes the wire insertion system of Example 9, wherein the base is further configured to move based at least in part on the predicted distance.

Example 11 includes the wire insertion system of Example 1, wherein the guidance device is tiltable to alter the wire path.

Example 12 includes the wire insertion system of Example 1, further comprising a wire straightener configured to straighten wire from the wire source.

Example 13 includes the wire insertion system of Example 1, further comprising a passive encoder positioned upstream from the feeder device.

Example 14 includes the wire insertion system of Example 13, wherein the passive encoder may be configured to detect a spatial or positional difference of the wire between the passive encoder and the feeder device, wherein the spatial or positional different is indicative of or proportional to a wire slippage amount.

Example 15 includes the wire insertion system of Example 13, wherein the feeder device and guidance device limit an unguided length of the wire to less than twenty wire diameters downstream of the feeder device.

Example 16 includes the wire insertion system of Example 1, wherein the feeder device and guidance device are configured to limit the wire path to a diameter of less than approximately 0.5 mm.

Example 17 includes a method of inserting a wire through first and second substrates, comprising: providing wire from a wire supply to a feeder device; increasing or decreasing slack of the wire in between the wire supply and the feeder device to fall within a predetermined range; feeding, by the feeder device, the wire through a first aperture of the first substrate and through a second aperture of the second substrate; and cutting the wire responsive to a determination that the wire has passed a predetermined distance through the second aperture of the second substrate.

Example 18 includes the method of Example 17, further comprising: measuring an amount of deviance of the wire from a center of the first or second aperture; and predicting, based on the measured amount of deviance, a potential amount of deviance of the wire from the center of a third aperture of the first or second substrate.

Example 19 includes the method of Example 18, further comprising adjusting, responsive to the predicted potential amount of deviance, one or more of a base on which the second substrate is mounted, a pressure applied on the wire by the feeder device and a position of the first substrate relative to the second substrate, to reduce the potential amount of deviance of the wire in the third aperture.

Example 20 includes the method of Example 17, further comprising straightening the wire prior to feeding the wire to the feeding device.

Example 21 includes the method of Example 20, wherein the straightening comprises straightening the wire to have a radius of curvature (Rc) greater than 150 mm.

Although certain embodiments have been illustrated and described herein for purposes of description, this application is intended to cover any adaptations or variations of the embodiments discussed herein. Therefore, it is manifestly intended that embodiments described herein be limited only by the claims. For example, while most of the discussion has described various mechanisms and techniques for straightening wire and inserting the straightened wire through aligned linear aperture paths, in various embodiments, pre-shaped wire may be inserted through substrate apertures. In various embodiments, those substrate apertures may be aligned or not aligned.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A wire insertion system comprising:
- a feeder device configured to feed wire from a wire source into a wire path;
- a guidance device with a channel that at least partially defines the wire path, to receive the wire fed from the feeder device;
- a wire straightener configured to straighten wire from the wire source; and
- a base for mounting at least one of a first substrate having a first aperture and a second substrate having a second aperture so that the first aperture of the first substrate is aligned with the second aperture of the second substrate, the base being configured to be movable relative to the guidance device to position the first substrate or second substrate so that the first or second aperture is aligned with the wire path.

2. The wire insertion system of claim 1, further comprising a cutting device for cutting the wire after insertion through the first and second apertures.

3. The wire insertion system of claim 2, wherein the cutting device is a single-sided blade with a flat side that is flush with a surface of the guidance device that is perpendicular to the wire path.

4. The wire insertion system of claim 2, wherein the guidance device includes a magnetic wear surface that is parallel to a plane defined by the cutting device.

5. The wire insertion system of claim 2, wherein the base is configured to be moved in tandem with movement of the cutting device to cut the wire.

6. The wire insertion system of claim 1, wherein the feeder device comprises a Capstan.

7. The wire insertion system of claim 6, wherein the wire source comprises a rim-driven hub.

8. The wire insertion system of claim 1, further comprising a machine vision device configured to determine a distance of the wire from a center of the first aperture or second aperture.

9. The wire insertion system of claim 8, further comprising logic configured to predict a distance of the wire from a center of a third aperture in the first substrate or a fourth aperture in the second substrate based on the determined distance.

10. The wire insertion system of claim 9, wherein the base is further configured to move based at least in part on the predicted distance.

11. The wire insertion system of claim 1, wherein the guidance device is tiltable to alter the wire path.

12. The wire insertion system of claim 1, further comprising a passive encoder positioned upstream from the feeder device.

13. The wire insertion system of claim 12, wherein the passive encoder may be configured to detect a spatial or positional difference of the wire between the passive encoder and the feeder device, wherein the spatial or positional different is indicative of or proportional to a wire slippage amount.

14. The wire insertion system of claim 12, wherein the feeder device and guidance device limit an unguided length of the wire to less than twenty wire diameters downstream of the feeder device.

15. The wire insertion system of claim 1, wherein the feeder device and guidance device are configured to limit the wire path to a diameter of less than approximately 0.5 mm.

16. A wire insertion system comprising:

a feeder device configured to feed wire from a wire source into a wire path;

a guidance device with a channel that at least partially defines the wire path, to receive the wire fed from the feeder device;

a base for mounting at least one of a first substrate having a first aperture and a second substrate having a second aperture so that the first aperture of the first substrate is aligned with the second aperture of the second substrate, the base being configured to be movable relative to the guidance device to position the first substrate or second substrate so that the first or second aperture is aligned with the wire path;

a machine vision device configured to determine a distance of the wire from a center of the first aperture or second aperture; and logic configured to predict a distance of the wire from a center of a third aperture in the first substrate or a fourth aperture in the second substrate based on the determined distance.

17. The wire insertion system of claim 16, wherein the base is further configured to move based at least in part on the predicted distance.

18. A wire insertion system comprising:

a feeder device configured to feed wire from a wire source into a wire path;

a guidance device with a channel that at least partially defines the wire path, to receive the wire fed from the feeder device;

a passive encoder positioned upstream from the feeder device; and a base for mounting at least one of a first substrate having a first aperture and a second substrate having a second aperture so that the first aperture of the first substrate is aligned with the second aperture of the second substrate, the base being configured to be movable relative to the guidance device to position the first substrate or second substrate so that the first or second aperture is aligned with the wire path.

19. The wire insertion system of claim 18, wherein the passive encoder may be configured to detect a spatial or positional difference of the wire between the passive encoder and the feeder device, wherein the spatial or positional different is indicative of or proportional to a wire slippage amount.

20. The wire insertion system of claim 18, wherein the feeder device and guidance device limit an unguided length of the wire to less than twenty wire diameters downstream of the feeder device.

21. A wire insertion system comprising:

a feeder device configured to feed wire from a wire source into a wire path;

a guidance device with a channel that at least partially defines the wire path, to receive the wire fed from the feeder device, wherein the feeder device and guidance device are configured to limit the wire path to a diameter of less than approximately 0.5 mm;

a base for mounting at least one of a first substrate having a first aperture and a second substrate having a second aperture so that the first aperture of the first substrate is aligned with the second aperture of the second substrate, the base being configured to be movable relative to the guidance device to position the first substrate or second substrate so that the first or second aperture is aligned with the wire path.

* * * * *